May 24, 1932.   J. E. THELLMOD ET AL   1,859,899
AUTOMATICALLY WORKING CONTINUOUS GEARING DEVICE
Filed March 21, 1930    4 Sheets-Sheet 1
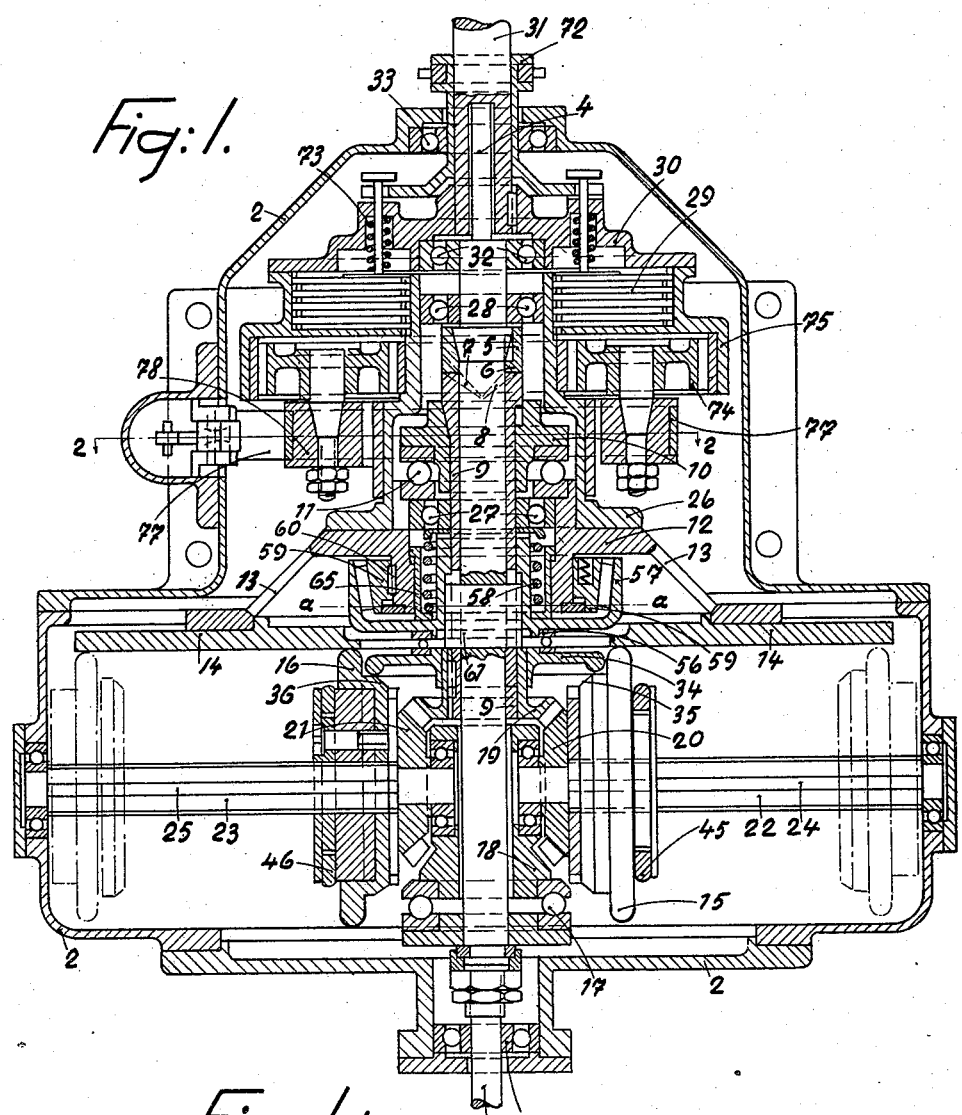
Fig: 1.
Fig: 4.
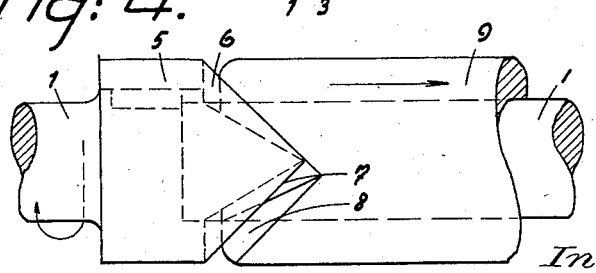

May 24, 1932.  J. E. THELLMOD ET AL  1,859,899
AUTOMATICALLY WORKING CONTINUOUS GEARING DEVICE
Filed March 21, 1930  4 Sheets-Sheet 2
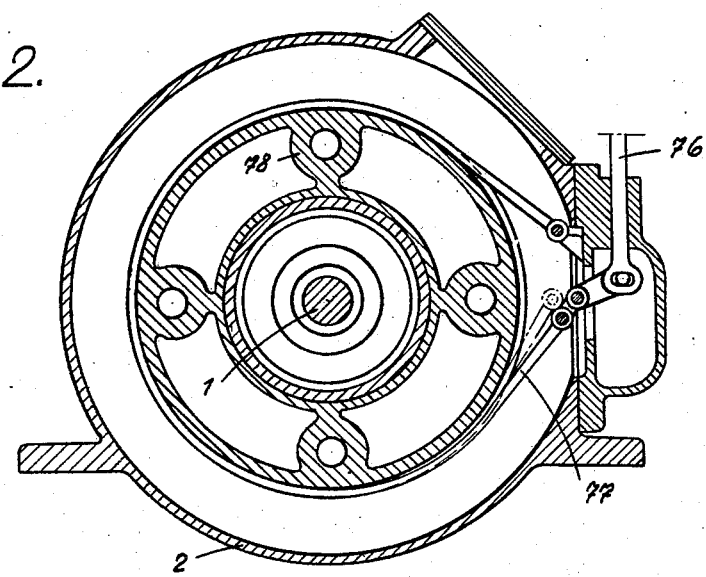
Fig:2.
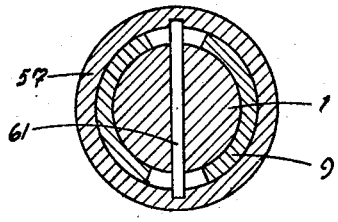
Fig:7.
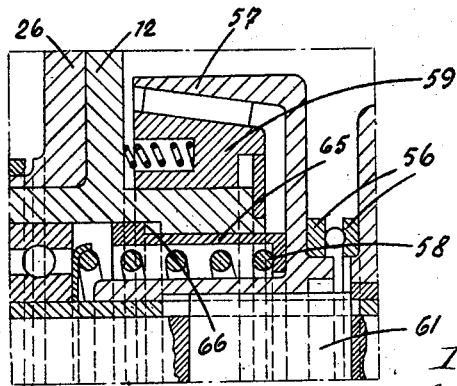
Fig:3.

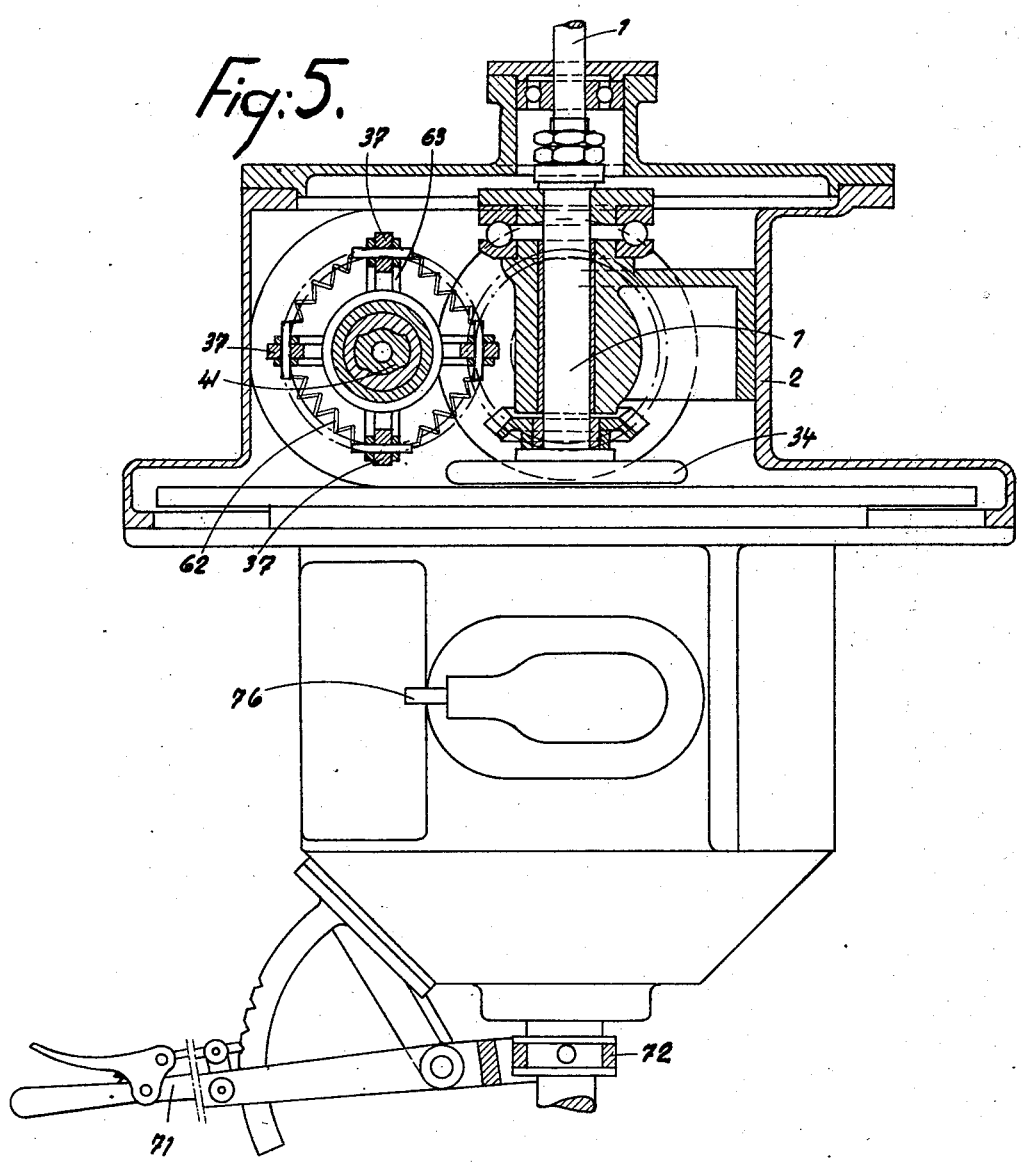

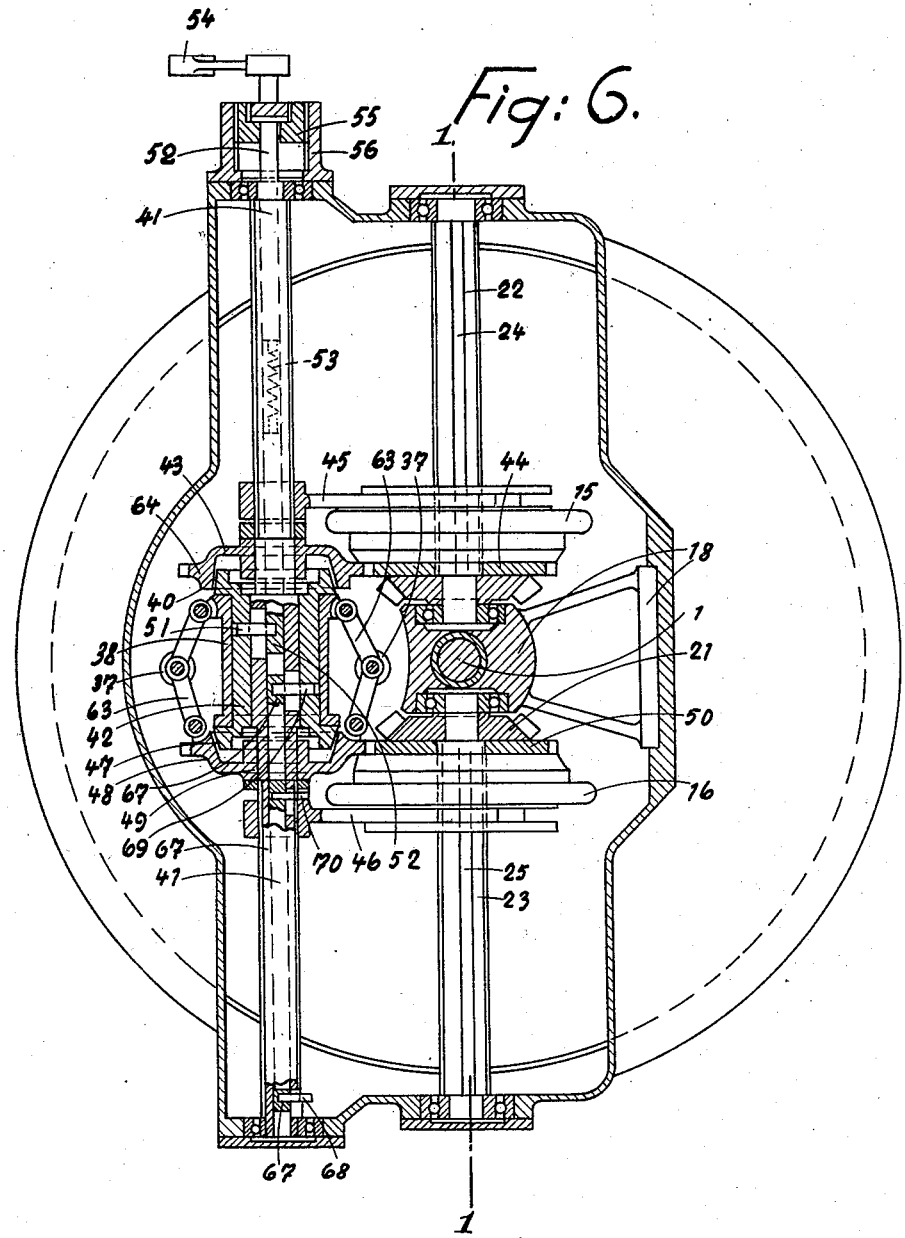

Patented May 24, 1932

1,859,899

UNITED STATES PATENT OFFICE

JOHAN EMIL THELLMOD AND BIRGER ZETTERGREN, OF STOCKHOLM, SWEDEN, ASSIGNORS TO HELGE GUSTAF TORULF, OF STOCKHOLM, SWEDEN

AUTOMATICALLY WORKING CONTINUOUS GEARING DEVICE

Application filed March 21, 1930, Serial No. 437,696, and in Sweden June 4, 1929.

This invention relates to automatically working gearing devices, especially those with friction clutch coupling.

The object of the invention is to obtain such an arrangement of the gearing device, that the normal pressure between the friction members is capable of being regulated by means of two cooperating surfaces, which cause a squeezing to one of the sides, for instance a wedge stone eccentric, lever, screw or similar member, by which the power is transmitted and influences the normal pressure, so that this becomes automatically variable according to the moment of torsion of the motor power or the load.

An embodiment, shown as an example, of the invention is illustrated in the accompanying drawings, where Fig. 1 shows a section on the line 1—1 of Fig. 6 through the horizontal plane of the gear case. Fig. 2 is a section on the line 2—2 of Fig. 1 through the rotor for the planet gearing, showing the brake device. Fig. 3 shows, on a larger scale, the $\pi$-coupling and appertaining parts of Fig. 1. Fig. 4 shows, on a larger scale, the normal pressure members. Fig. 5 shows a partially sectioned side view. Fig. 6 shows a cross section of the friction rolls and the centrifugal governors. Fig. 7 is a section on the line a—a of Fig. 1 showing the wedge 61 on a larger scale.

The motor shaft 1 is journalled in the outer surrounding case 2 by means of the bearing 3 and the journal 4 (sliding bearing). A normal pressure member 5 (see Fig. 4) is rigidly connected to the shaft 1. The end surface 6 of the pressure member, which, according to the embodiment, is formed as a wedge plane 7, presses against the corresponding wedge plane 8 of the axially movable sleeve 9 rotating together with the shaft 1.

The moment of torsion or resistance of the motor, which is transmitted to the wedge planes, develops an axial pressure or a normal pressure $$N = \frac{P}{\sin \alpha},$$

where $\alpha$ equals the wedge angle. This pressure $N$ is now transmitted by the sleeve 9 to the pressure member 10, which is rigidly connected to the sleeve, and by the journal 11 to the hub 12, and further by the arms 13 to the friction disk 14 resting against the friction rolls 15 and 16. The pressure corresponding to $N$ is taken up by the pressure journal 17 on the motor shaft 1 against the floor-stand 18, which also serves to support the shaft 1.

The moment of torsion of the motor is transmitted by the shaft 1 to the wedge members and the sleeve 9. A toothed wheel 19 is mounted on the sleeve 9 in such a way, that the sleeve may be moved relatively the toothed wheel, which transmits the moment of torsion to toothed wheels 20 and 21, said wheels being rigidly connected to driving shafts 22 and 23. Wedges 24 and 25 are fixed in the shafts 22 and 23, which wedges drive the axially movable friction or driving rolls 15 and 16, which transmit the moment of torsion of the motor to the friction disk 14, the arms 13 and the hub 12.

An intermediate sleeve 26 is rigidly connected to the hub 12 and through the latter journalled in journals 27 and 28. The intermediate sleeve 26 is by means of a multiple disk clutch 29 rigidly connected to a flange 30 wedged in the driving shaft 31. The flange 30 and the shaft 31 are journalled in journals 32 and 33, the journal 32 being supported by the driving shaft 1.

Fig. 1 shows the motor coupled directly to the driven shaft 31, i. e. the moment of torsion does not go through the normal pressure members to the sleeve 9 etcetera. At direct coupling, the rolls 15 and 16 lie on a diameter of the disk, said diameter slightly exceeding that of the rolls. The rolls have then pressed in a pressure disk 34 by means of oblique planes 35 and 36 on the rolls 15 and 16.

The pressure disk 34, which rotates freely about the toothed wheel 19, presses through a pressure journal 56 against a $\pi$-clutch 57 under influence of the initial suspension spring 58, and connects in a known way the clutch 57 to the axially resilient $\pi$-clutch 59, which by means of a wedge or several wedges 60 is connected to the hub 12. The moment of torsion of the motor now goes through a wedge 61 direct to the clutches 57, 59, the hub 12, the intermediate sleeve 26, the multiple disk clutch 29 and the flange 30 and transmits the moment to the driven shaft 31. At the same time the pressure of the initial suspension spring 58 over the journals 27 and 11, the pressure member 10 and the sleeve 9, on the one hand, and over the clutch 57, the pressure journal 56 and the pressure disk 34, on the other hand, against the oblique planes 35 and 36 aims to unload the normal pressure between the disk 14 and the rolls 15 and 16.

Should the number of the revolutions of the motor decrease under the normal on account of a larger resistance on the driven shaft, the counter weights 37 of the centrifugal governor (see Figs. 5 and 6) will aim on account of the pressure of the governor springs 62, to press a sleeve 38 by means of links 63, moving the friction disk 40 of the carrier 42, which is splined to a shaft 41 against the friction disk 64 in the toothed wheel 43 freely rotating on the shaft 41, said toothed wheel getting its motion from the toothed wheel 44, which is rigidly connected to the shaft 22. As the regulation shaft 41 is right-handed at the upper side of the centrifugal governor, and left-handed threaded at the lower side, depending on the direction of motion of the motor, the shaft 41 aims by the motion from the toothed wheels 43 and 44, to screw off the roll pressers 45 and 46 carrying the rolls 15 and 16. The π-clutch 57 (Fig. 1) is in consequence of this disengaged from the clutch 59 on account of the disk 34 rolling off the rolls 15 and 16. The initial suspension spring 58 follows with the sleeve 65 (see Fig. 3), which immediately strikes against the lip 66 on the hub 12, transmitting the initial pressure to the disk 14 against the rolls 15 and 16.

Should the motor go on keeping the number of the revolutions under the normal, the roll pressers 45 and 46 will aim to screw off the rolls 15 and 16 to the position corresponding to the resistance, possibly to the outer boundary position (the dot-and-dash-lined one), the largest gearing being then obtained. In order to prevent the disks 40 and 64 from rubbing against each other when the roll is at its outer position, a rod 67 with the journal 68 is mounted in the shaft 41. The presser 46 presses against the journal 68 during axial movement of the rod 67, and influences the carrier 42 by means of the journal 69, so that free run is obtained.

When the resistance decreases, so that the number of revolutions increases over the normal the centrifugal weights strike out and press the friction disk 47 of the carrier 42 by means of the links 63 and the sleeve 38 against the friction disk 48 of the toothed wheel 49 freely rotating on the shaft 41. The toothed wheel 49 gets its motion from the toothed wheel 50, which is rigidly connected to the shaft 23. When now the carrier by means of the disks 47, 48 are brought into rotation carrying with it the shaft 41, the roll pressers 45 and 46 are screwed inwards towards the centre of the disk 14, and to direct coupling again if the motor power allows it. In order to prevent the disks 47 and 48 from rubbing against each other when direct coupling has been obtained, the roll presser 46 moves the rod 67 by means of the journals 69 and 70 and the carrier 42 towards the sleeve 38, so that the disks 47 and 48 are disengaged from each other, and free run is obtained.

In order to get a regulatable setting at different desired numbers of revolutions, a pull and suspension spring 53 is mounted in the upper part of the shaft 41, and this spring may be strained or relaxed by means of a nut 55 in the mantle 56 with the help of an arm 54. The straining of the spring then influences the carrier 42 by means of the rod 52 and the journal 51, and regulates the counter weights of the centrifugal governor.

When going astern (see Figs. 1, 2 and 3) one proceeds in the following manner.

At free coupling the lever 71 (Fig. 5) is moved upwards disengaging the coupling 72, which is axially movable on the shaft 31 (see Fig. 1). The clutch springs 73 are strained and disengage the multiple disk clutch 29, the toothed wheels 74 rolling then freely in the planet ring 75. When going astern the brake band strainer 76 (see Fig. 2) is pressed downwards (the latter may be connected to the lever 71 or to a foot pedal) and strains the brake band 77, so that the rotor stops, the direction of motion being then reversed by the planet ring 75.

The multiple disk clutch has been placed behind the ingoing shaft 1 for the purpose of taking up possible bumps or abnormal resistances on the driven shaft. As the normal pressure increases in proportion to the resistance when the power comes from the driven shaft, it might be thought, that the pressure will become so large, that the surfaces between the parts 14 and 15 might be crushed, but this is excluded with the multiple disk clutch serving as sliding member. Moreover, the disk 14 ought to be necessary swinging mass, and therefore the balance-wheel of the motor drops out, or, in other words, the balance wheel may be constructed as a friction disk, and therefore the total weight ought not to exceed that of the present gear case.

It is clear, that even two friction disks, one on each side of the rolls 15 and 16, may be used without going beyond the scope of the invention.

Having now described our invention, what we claim as new and desire to secure by Letters Patent is:

1. A gearing device of the character described comprising, a driving shaft, a variable gear connection, and means for determining and controlling the operation of said variable gear, said means including a normal pressure member associated with the driving shaft and responsive to variations in the moment of torsion of the motor power or load, a centrifugal governor, means for balancing the weight of the governor at a selected speed of rotation, means operable by the governor for varying the ratio of the gear in one direction when the selected speed of rotation is exceeded and means operable by the governor for varying the ratio of the gear in the other direction when the selected speed is not reached.

2. A gearing device of the character described comprising, a driving shaft, a variable gear connection and means for determining and controlling the operation of said variable gear, said means including an initial pressure device associated with the variable gear and a normal pressure member associated with the driving shaft and responsive to variations in the moment of torsion of the motor power or load, a centrifugal governor, means for balancing the weight of the governor at a selected speed of rotation, means operable by the governor for varying the ratio of the gear in one direction when the selected speed of rotation is exceeded and means operable by the governor for varying the ratio of the gear in the other direction when the selected speed is not reached.

3. A gearing device of the character described comprising, a driving shaft, a variable gear connection, and means for continuously regulating the ratio of the gearing, said means including an initial pressure device associated with the variable gear and a normal pressure member associated with the driving shaft and responsive to variations in the moment of torsion of the motor power or load, a centrifugal governor, means for balancing the weight of the governor at a selected speed of rotation, means operable by the governor for varying the ratio of the gear in one direction when the selected speed of rotation is exceeded and means operable by the governor for varying the ratio of the gear in the other direction when the selected speed is not reached.

4. In a device of the character described, a variable gear, a centrifugal governor, means for balancing the weight of the governor at a selected speed of rotation, a screw for varying the ratio of the gear in one direction when the selected speed of rotation is exceeded and in the other direction when the selected speed is not reached, means operable by the governor for causing the actuation of the screw, and a device adapted to stop the actuation of the screw automatically when the gear ratio has been varied to its extreme in either direction.

5. A gearing device of the character described comprising, a driving shaft, a normal pressure member on said shaft, said member being adapted to transmit both axial pressure and torsion, a driven shaft, a variable gear including a friction disk and a friction roll, means for communicating the axial pressure from the normal pressure member to the friction disk, and means including a clutch for overcoming said axial pressure and for directly coupling the driving shaft and the driven shaft, said means being brought into operation by the axial motion of the friction roll.

In witness whereof we have hereunto signed our names.

JOHAN EMIL THELLMOD.
BIRGER ZETTERGREN.